J. G. PAULIN.
PRESSURE GAGE LOG.
APPLICATION FILED APR. 10, 1918.
1,398,792.
Patented Nov. 29, 1921.
3 SHEETS—SHEET 2.
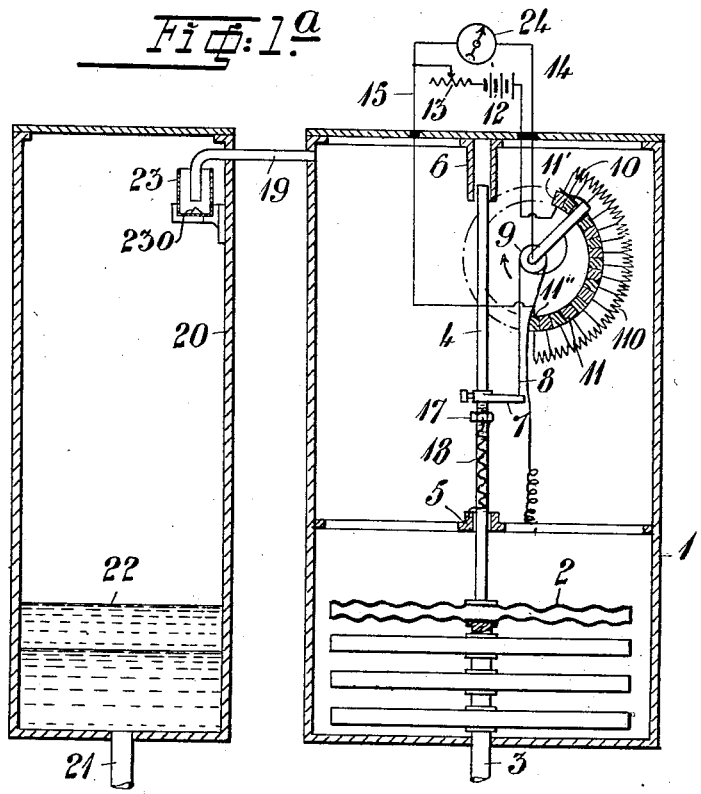
Fig. 1a.
Fig. 2.
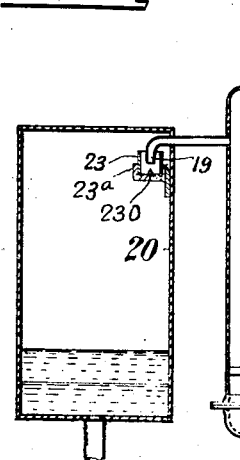
Inventor
J. G. Paulin

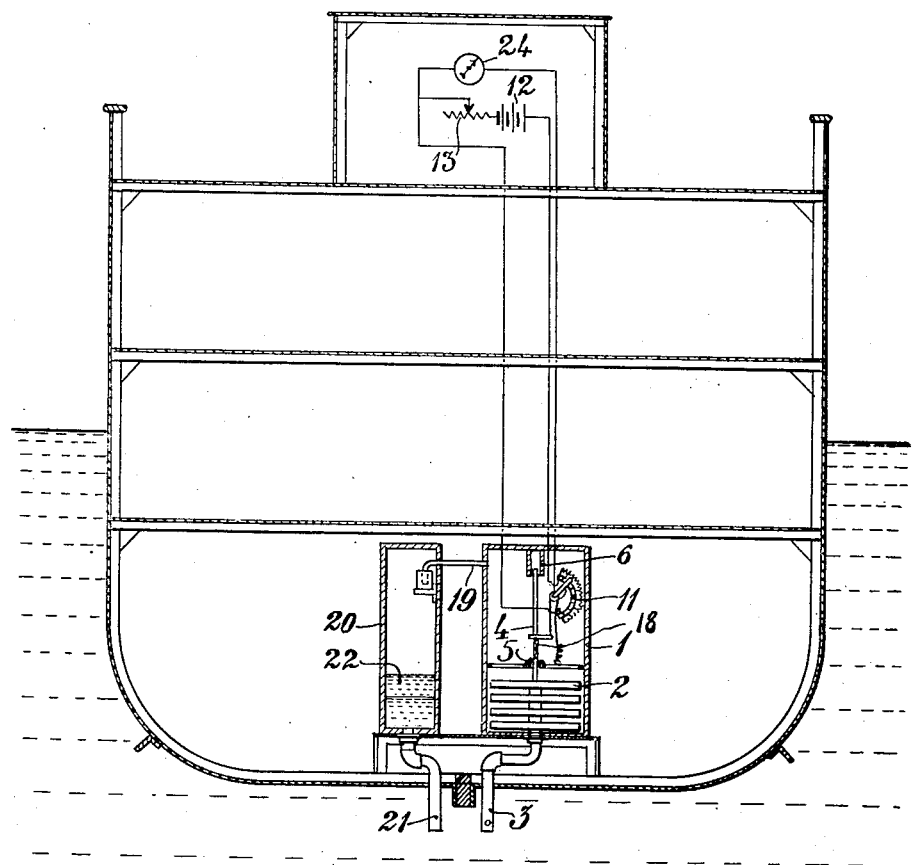

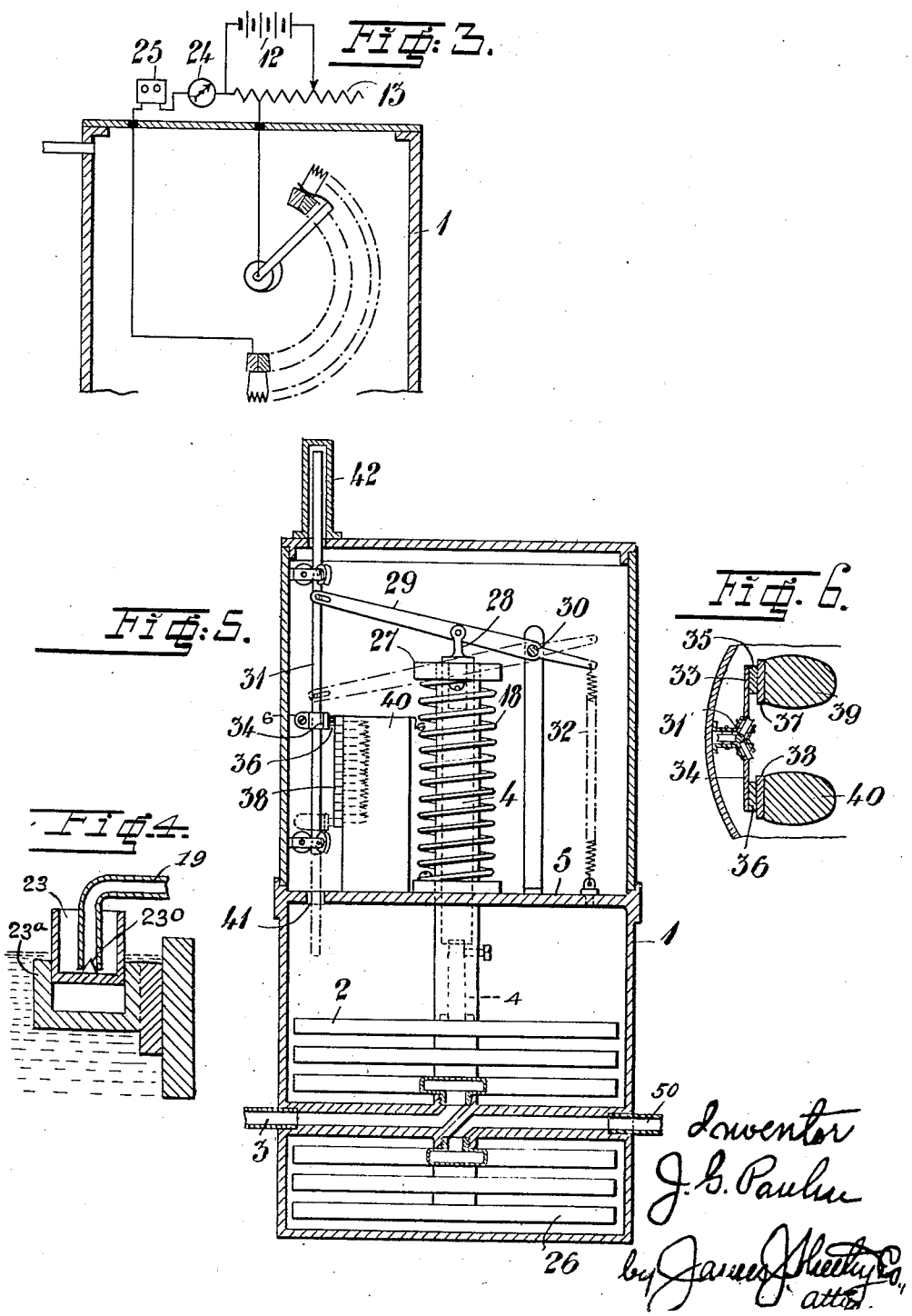

UNITED STATES PATENT OFFICE.

JOSUA GABRIEL PAULIN, OF STOCKHOLM, SWEDEN.

PRESSURE-GAGE LOG.

1,398,792.   Specification of Letters Patent.   Patented Nov. 29, 1921.

Application filed April 10, 1918. Serial No. 227,799.

*To all whom it may concern:*

Be it known that I, JOSUA GABRIEL PAULIN, a citizen of the Kingdom of Sweden, residing at Stockholm, Sweden, have invented new and useful Improvements in Pressure-Gage Logs, (for which I have filed an application in Sweden, March 8, 1917,) of which the following is a specification.

This invention relates generally to logs in which the pressure produced in a Pitot-tube due to the movement of the vessel through the water is utilized for indicating the speed of travel of the vessel as well for registering the distance traversed by the vessel. The object of the invention is essentially to provide an improved log of the kind set forth in my pending application Serial Nr. 198,691. In the log set forth in said application, the said pressure is caused to act upon a diaphragm mechanism controlling a rheostat the different resistances of which are so adjusted that the tension or the strength of current of a circuit controlled by said rheostat will vary according as the speed of travel of the vessel varies.

In logs having a diaphragm mechanism it has heretofore met with great difficulties in providing a suitable packing for the moving parts extending through the walls of the casing or box of the diaphragm mechanism to transfer motion from said mechanism to the indicating device, as said casing is subjected to a more or less great pressure.

According to this invention, the said difficulty is overcome by mounting the rheostat within the casing of the diaphragm mechanism so that no movable part at all may extend through the walls of the casing of the diaphragm mechanism.

Other features of the invention will sufficiently appear from the following description with reference to the accompanying drawings which illustrate several embodiments of the invention.

Figure 1 is a diagrammatic cross section through a vessel in which an apparatus according to this invention is mounted. It should be noted that the dimensions of the apparatus do not correspond to those of the vessel, as this figure is for the purpose of illustration only. Fig. 1ᵃ is an essentially diagrammatic vertical section through an apparatus according to this invention. Fig. 2 is a similar section through a modified form of the invention. Fig. 3 is a similar section through part of a third embodiment of the invention. Fig. 4 is a detail view showing the action of the valve 230. Fig. 5 shows a vertical section through a fourth further modified embodiment of the invention. Fig. 6 is a section taken in the plane indicated by the lines 6—6 of Fig. 5 and elements in rear thereof as disclosed by Fig. 5 being eliminated.

With reference to Figs. 1 and 1ᵃ of the drawings the numeral 1 indicated a casing in which is mounted a series of diaphragm boxes 2. the interior of which is connected to a Pitot tube 3 that extends through the bottom or hull of a vessel. Attached to the uppermost diaphragm box 2 is a rod 4 slidably mounted in bearings 5 and 6 and arranged on the rods is an arm 7 which is adjustable by a thumb screw to different positions on the rod. The arm 7 is connected by means of a flexible band or the like to a pivotally mounted disk 9 and said disk is provided with a contact spring 10 that is adapted to bear against the stationary contact segments 11 of a rheostat.

These contact segments 11 are arranged as a ring concentric with the disk 9 and connected in series between the end contact segments 11' and 11" is a source of electric current. The wiring arrangement used in connection with my invention is similar to that shown and described in the patent to Blanc 664,328 of Dec. 18, 1900.

The disk 9 is acted upon by a spring that tends to turn the disk in the direction indicated by arrow in Fig. 1ᵃ and this spring tends also to keep the band 8 under tension.

Abutting at one end against a collar 17 on the rod 4 and at its opposite end against the bearing 5 is a spring 18 and by adjusting the tension of this spring such pressure may be exerted as to cause the spring 10 to reach the last contact as the speed of the vessel reaches the highest degree of speed registerable on the indicator. The spring of Fig. 1ᵃ is a conventional one and is connected at one end to disk 9 and at the opposite end to bearing 5. By adjusting the resistances between the different contacts of the rheostat all error in indicating the speed of the vessel may be eliminated and this, it will be manifest, is an important feature when it is considered that error may be occasioned by unequal resistance of the diaphragm boxes in different positions or to the fact that the pressure that is exerted by various speeds of the vessel does not exactly and evenly increase with the speed thereof owing to the currents that may be present in the waters through which the vessel travels. Adjustment of the resistances should be made to vary with the speed of the vessel.

The interior of the casing 1 is connected by means of a pipe 19 arranged near the top thereof to the interior of a receptacle 20 connected at its bottom to a pipe 21 adapted to transmit hydrostatic pressure at the mouth of the Pitot-tube 5 to the interior of said receptacle 20. The receptacle 20 is partially filled with oil and said oil will form a layer as indicated by 22 when water is permitted to enter the receptacle and consequently the oil will prevent to a certain degree rapid variations of the hydrostatic pressure. The pipe 19 is bent downwardly in the receptacle 20 and to prevent the splashing of the liquid a guard 23 is arranged directly below the pipe 19 and at the lower end of the guard 23 a valve 230 having a stem 231 is secured. This valve 230 seats in the open end of the pipe 19 and thus liquid will be precluded from entering the receptacle 20 and pass into the casing 1. The float 23 is directed in its movement by the guide 23ª. The operation of the device is as follows,—the pressure produced in the pipe 3 and transferred by this pipe to the interior of the diaphragm boxes, is composed while in motion of the vessel, of the hydrostatic pressure and pressure due to the movement of the vessel through the water. Said pressure tends to enlarge the diaphragm boxes 2 which results in a tendency of the boxes to move the rod 4 upwardly and the hydrostatic pressure transferred from the pipe 21 to the receptacle 20 produces more or less compression of the air contained in the receptacle and the casing 1 and corresponding to the degree of said pressure.

The embodiment shown in Fig. 2 differs from that just described in this that for the diaphragm boxes is substituted a single diaphragm 2 dividing the casing 1 in two compartments 1' and 1". The former is adapted to be connected by means of the pipe 3 to a Pitot-tube (not shown) while the compartment 1" which contains the rheostat, is connected to a receptacle 20 in the same way as described with reference to Fig. 1. The operation of the apparatus shown in Fig. 2 is analogous with that just described with reference to Figs. 1 and 1ª.

In the apparatus shown in Figs. 1, 1ª and 2, three wires at least must extend through the wall of the casing 1, viz. the wires connecting the two end contacts 11' and 11" of the rheostat to the resistance 13 and one pole of the battery 12. It should be noted, that the resistance 110 of the rheostat may, if desired, be arranged outside the casing 1 instead of in the interior thereof, in which case also the wires connecting the resistances to the contact segments 11 must be air-tight and extend through the wall of the casing.

Fig. 3 shows a modified circuit diagram for use in connection with the apparatus shown in Figs. 1ª or 2 and in which two wires only extend through the wall of the casing 1. In Fig. 3 an ampere-hour meter 25 which may be provided with a distance scale is connected in series with the speed indicating ampere-hour or voltmeter 24.

In the apparatus shown in Figs. 1ª or 2 the air contained in the casing 1 and the receptacle 20 will be considerably compressed with increase of the hydrostatic pressure. The increase of the height of the liquid column in the receptacle 20 thus occurring results in an appreciable incorrectness in the operation of the measuring instruments. Said inconveniences may be overcome by filling the casing 1 and the receptacle 20 with a suitable liquid, such as petroleum, compressible to a small extent only with increasing hydrostatic pressure, and at the same time acting as an insulator.

A suitable form of an apparatus the casing of which is adapted to be filled with such a liquid is shown in Fig. 5 part thereof being also illustrated in Fig. 6. Referring to Fig. 5, the casing 1 contains a number of diaphragm boxes 2, the interior of which is adapted to be connected to a Pitot-tube 9 (not shown) by means of a pipe 3. Another set of diaphragm boxes 26 equal in number to that of the boxes 2, is adapted to be connected to a pipe 50 transmitting the hydrostatic pressure to the interior of said boxes 26. The boxes 26 should preferably be made of a material having a great degree of flexibility. The boxes 2 carry a rod guided in an intermediate bottom 5 in the casing 1, a tension spring 18 surrounding said rod and having its lower end attached to the said intermediate bottom 5, while its upper end is connected to a collar 27 rigidly attached to the rod 4. Pivotally connected with an extension 28 of the rod 4 is a lever 29 mounted to turn on the stationary pivot 30 and having its one end connected to a vertically slidable rod 31, while the other end of the lever 29 is operated by a spring 32 tending to turn the lever on its pivot in such a way as to cause it to displace the rod 31 upwardly. The rod 31 carries by means of two laterally extending arms 33 and 34, respectively (see Fig. 6) two contact brushes 35, 36 respectively, bearing each against a set of vertically arranged contact segments 37, 38. The resistances are preferably arranged in a separate casing 39 or 40, respectively, resting on the bottom 5. The bottom 5 may be provided with a hole 41 to permit the movement of the rod 31 therethrough a suitable cap or the like 42 being mounted on the top of the casing 1 to receive the upper end of the rod while in its uppermost position. The casing 1 is completely closed and filled with a suitable liquid such as petroleum, not affecting the casing 1, nor the parts contained therein. The resistances of the rheostats are so adjusted as is already described with reference to Fig. 1. The electrical connections are not shown in Fig. 5 as they may be the same as shown in Figs. 1 or 3. When the pressure transmitted through the pipe 3 increases, the diaphragm boxes 2 will be enlarged so as to displace the rod 4 and at the same time tending to compress the liquid within the casing 1. Because of the fact that this liquid is incapable of being compressed, the operation of the boxes 2 will permit corresponding compression of the boxes 26 by said liquid. As the rod 4 rises, due to the operation of the boxes 2, the lever 29 will be swung to raise the rod 31, so that the contact brushes 35 and 36 will slide along the contact pieces 37 and 38 respectively, thereby changing the resistance of the circuit controlled by the rheostat so that the instruments included therein will operate in conformity to the speed of the vessel in the same way as is already described with reference to Fig. 1.

Several modifications may be made in the construction of the apparatus without departing from the spirit of the invention. For instance the adjustment of the different resistances of the rheostat may be effected not only by adjusting the resistances itself, but also by giving the contact segments of the rheostat different thicknesses, in which case the different resistances may all be uniform.

Having described my invention, what I claim and desire to secure by Letters Patent is:—

1. Pressure gage log comprising a closed casing, a diaphragm device within said casing connected with a Pitot-tube adapted to extend through the hull of a vessel, another tube for transmitting to the interior of said casing the hydrostatic pressure existing at the mouth of the said Pitot-tube, a rheostat in said casing, controlled by said diaphragm device, an electric circuit controlled by said rheostat, and electrically operated indicating instruments in said circuit.

2. Pressure gage log comprising a closed casing, a number of diaphragm boxes within said casing, the interior of which is connected with a Pitot-tube adapted to extend through the hull of a vessel, another tube for transmitting to the interior of said casing the hydrostatic pressure existing at the mouth of said Pitot-tube, a rheostat in said casing, controlled by the movement of said diaphragm boxes, an electric circuit controlled by said rheostat and electrically operated indicating instruments in said circuit.

3. Pressure gage log comprising a closed casing, a diaphragm device within said casing, connected with a Pitot-tube adapted to extend through the hull of a vessel, another closed casing, communicating at its upper end with the said first-mentioned casing, a tube for transmitting to the interior of said other casing the hydrostatic pressure existing at the mouth of the Pitot-tube, a rheostat in the first-mentioned casing, controlled by the diaphragm device, a circuit controlled by said rheostat, and electrically operated indicating instruments in said circuit.

4. Pressure gage log comprising a closed casing, a number of diaphragm boxes within said casing, a Pitot-tube adapted to extend through the hull of a vessel and connected with the interior of the diaphragm boxes, a slidably mounted rod within said casing connected with said diaphragm boxes for being operated thereby, a rheostat within said casing, the stationary contact segments of which are arranged annularly, and the movable contact of which is pivotally mounted, connections between said movable contact and said rod, an electric circuit controlled by said rheostat, electrically operated indicating instruments in said circuit, another casing communicating at its top with the upper end of said first-mentioned casing, a tube for transmitting to the interior of said casing the hydrostatic pressure existing at the mouth of the Pitot-tube, and an oil-layer in said other tube.

5. Pressure gage log comprising a closed casing, a diaphragm device within said casing, a Pitot-tube connected with said diaphragm device and adapted to extend through the hull of a vessel, a rheostat in said casing, controlled by said diaphragm device, a circuit controlled by said rheostat, electrically operated indicating instruments in said circuit, another casing, a communicating pipe between the upper ends of the said two casings, a downwardly extending open end of said pipe within said other casing, a splash-guard beneath said open end, said splash-guard being formed as a float having a valve for closing said open end when lifted, a tube for transmitting to the interior of said other casing the hydrostatic pressure existing at the mouth of the Pitot-tube.

In testimony whereof I have signed my name.

JOSUA GABRIEL PAULIN.